United States Patent Office 2,743,166
Patented Apr. 24, 1956

2,743,166

PREPARATION OF TITANIUM MONOXIDE

Eugene Wainer, Cleveland Heights, Ohio, assignor, by mesne assignments, to Horizons Titanium Corporation, Princeton, N. J., a corporation of New Jersey No Drawing. Application May 10, 1952, Serial No. 287,263

4 Claims. (Cl. 23—202)

Titanium monoxide is an attractive raw material for preparation of titanium metal through the medium of electrolysis; and methods for making titanium monoxide which involve the heating of titanium carbide in the presence of an oxide of the second group elements such as magnesium, calcium, and zinc, offer important advantages. In these latter procedures, the by-products of the reaction are titanium monoxide, carbon monoxide, and the respective metals of the second group oxides. In order to make a procedure of this type commercially attractive, it is necessary to insure a complete recovery of the valuable metal by-product.

Known and described in the literature are methods of a different order for making titanium monoxide, chiefly those involving reacting a mixture of titanium dioxide with magnesium metal, in which the by-products are titanium monoxide and magnesium oxide; but the difficulty with such type of reaction is that it requires a chemical separation of the magnesium oxide from the desired end product. One of the possible difficulties involved in the carrying out of the first above-mentioned procedures is the necessity for accomplishing the reaction under carefully controlled high temperature conditions, which tends to make the method an expensive one as far as items of equipment are concerned, even though a product of high purity and good yield is obtained at low cost. A distinct advantage would be afforded if no need for this recovery of by-products existed.

In accordance with the present invention, all of the foregoing difficulties can now be obviated, and a particularly practical procedure is made available. Other objects and advantages will appear from the following description.

To the accomplishment of the foregoing and related ends, said invention, then comprises the features hereinafter fully described and particularly pointed out in the claims, the following description setting forth in detail certain illustrative embodiments of the invention, these being indicative, however, of but a few of the various ways in which the principle of the invention may be employed.

I have now found that if various oxide type raw materials of titanium are heated in the presence of carbon at a sufficiently high temperature to cause general fusion and reaction between the titanium raw material and carbon and if in addition, the reaction mass is being simultaneously oxidized by water vapor with or without the presence of a minor amount of $CO_2$ or pure $CO_2$, then pure fused titanium monoxide is obtained substantially free of higher oxides of titanium and free of combined carbides. In order to accomplish this desired end, the atmosphere of the reaction zone must be controlled to prevent incorporation of nitrogen or oxygen from the air. Fortunately, the nature of the reactions are such as to provide an inherent controlled atmosphere.

Basically, the reaction involves at least the temporary preparation of titanium carbide, the important point being that the simultaneous oxidation with water with or without $CO_2$, or with $CO_2$ alone, can take place. Actually, preformed titanium carbide may be used for the purposes of this reaction and with results comparable to those normally obtained through a mixture of suitable raw ingredients. The use of water vapor as an oxidant is preferred, since in the rigid exclusion of this agent it is difficult to obtain titanium monoxide free of carbon as, for example, might be the case if carbon dioxide itself were used wholly as the oxidizing agent.

In general, the reactants involved are (1) a source of titanium such as the oxide or ilmenite, (2) a reducing agent such as carbon or a carbide, in which case the carbide may be titanium carbide itself, (3) a weak oxidizing agent such as water vapor or $CO_2$. Various combinations of these reagents may be used effectively. The oxidizing agent may consist of pure water or a combination of water and carbon dioxide. It is imperative that the atmosphere of reaction be free of nitrogen or oxygen, and this is attained through the manner in which the reaction equipment is constructed. In order for the reaction to take place with reasonable efficiency and in order for it to proceed to completion in formation of the pure titanium monoxide, the reaction temperature must be in excess of that required to fuse the monoxide, namely, approximately 1800° C. It appears that the optimum range of reaction is between 1800° C. and 2100° C. While such temperatures may be obtained on a small scale by use of induction furnace techniques, the optimum type of equipment for this purpose is a suitably constructed arc furnace.

Thus when no iron is involved, the reaction mixtures may consist of combinations of the following: titanium carbide, titanium oxide, carbon, water, and $CO_2$.

When ilmenite is used as the raw material, the same general reactions take place except that the end product of the reaction is a mixture of metallic iron and titanium monoxide intimately mixed with each other, in which case the metallic iron is in the form of rather coarse shot. After crushing and magnetic separation, the two end products of the reaction may be obtained in relatively pure form, the iron containing up to 3 per cent carbon in combined form, this being comparable to cast iron.

While is not wholly certain as to the exact chemistry of the reactions which can take place, their nature is indicated from the equations as follows:

1. $TiC + 2H_2O \rightarrow TiO + CO + 2H_2$
2. $2TiC + 3H_2O + CO_2 \rightarrow 2TiO + 3CO + 3H_2$
3. $TiO_2 + 2C + H_2O \rightarrow TiO + 2CO + H_2$
4. $TiO_2 + TiC + H_2O \rightarrow 2TiO + CO + H_2$
5. $2TiO_2 + 4C + CO_2 + H_2O \rightarrow 2TiO + CO + H_2$
6. $TiO_2 + 3C + 2H_2O \rightarrow TiO + 3CO + 2H_2$
7. $FeO.TiO_2 + 3C + H_2O \rightarrow Fe + TiO + 3CO + H_2$
8. $2FeO.TiO_2 + 6C + H_2O + CO_2 \rightarrow 2Fe + 2TiO + 7CO + H_2$
9. $TiO_2 + 2TiC + 3H_2O \rightarrow 3TiO + 2CO + 3H_2$
10. $FeO.TiO_2 + 6C + 4H_2O \rightarrow Fe + TiO + 6CO + 4H_2$
11. $TiO_2 + 6C + 5H_2O \rightarrow TiO + 6CO + 5H_2$
12. $TiC + 2CO_2 \rightarrow TiO + 3CO$
13. $TiO_2 + 2C + CO_2 \rightarrow TiO + 3CO$
14. $FeO.TiO_2 + 3C + CO_2 \rightarrow TiO + Fe + 4CO$ These equations indicate the nature of the various raw materials which can be used for the purposes of this invention.

In carrying out these reactions, a convenient type of equipment for accomplishing the purpose is a pot type arc furnace, in which the furnace itself consists of a water cooled shell. The top of the furnace is brought up close to the center electrode and any gas that forms in the reaction is thus forced through the annular opening between the water cooled shell and the center electrode. As seen from the equations, these gases are strongly reducing consisting of mixtures of carbon monoxide and hydrogen or CO alone. They burn at the mouth of the furnace and form an effective curtain to prevent the diffusion of air back into the hot reaction mass. The roof of the furnace is fitted with an automatic feeding device whereby the raw materials are metered into the hot zone under the arc. The water vapor and/or carbon dioxide is admitted into the furnace under pressure through the medium of a hole bored through the length of the center electrode. The water is forced in under pressure using a steam boiler and when carbon dioxide is used in addition, this may be fed in separately through a Y tube connection or directly into the steam boiler itself. As a matter of fact, it is sometimes advantageous to use carbon dioxide in this latter way to insure that no air enters into the reaction zone.

The water vapor is conveniently supplied from a boiler and a feeding pressure of at least 100 pounds per square inch is used. The higher pressures are an advantage. The actual amount of water vapor which leaks into the furnace through the center hole ground in the hot carbon electrode is regulated through the medium of valves between the boiler and the center electrode. One of the reasons for the requirement that the center electrode be relatively large in diameter is that some burning of the electrode takes place through result of reaction between carbon and water vapor, if the temperature of the carbon is too high. By making the diameter of the electrode relatively large, only the area of the carbon directly exposed to the arc is hot enough for this decomposition reaction to take place as indicated and relatively little loss of electrode is obtained from this reaction.

The feeding of the raw materials is continuous at a rate where the amount of water vapor and carbon dioxide is slightly in excess of that indicated by the equations given. It is significant to note that excessive amounts of water may be used providing an ample amount of carbon is used to react with this excess water. A qualitative determination that the rates of addition are being properly metered is obtained from the action of the electrode. It has been noted previously that in order for the reaction to proceed properly the titanium monoxide must be in a fused condition. Under this situation, a vibration takes place and the arcing is smooth and uniform. If the mass is solid, this vibration is not noticed and the arc action is erratic and violent.

An advantage of the water cooled shell type of reactor is the fact that the shell need not be lined with carbon. It has been found that if carbon lined furnaces are used, it is difficult to prevent the formation of combined carbides of titanium on the exterior areas of the pig. Though these carbides may be removed mechanically after the pig has been cooled, it represents a difficulty and a loss of yield. Under the conditions of operation just indicated, namely where the temperature of reaction is between 1800 and 2100° C., the fused titanium oxide freezes in a thin shell as rapidly as formed, up against the walls of the container and thus forms its own crucible almost instantaneously. The titanium monoxide is a sufficiently good conductor, particularly when hot, to maintain the current.

If titanium carbide is used as the basic raw material, it may be fed into the furnace in the form of lumps roughly 1/4 inch in diameter or less. If titanium dioxide is used, it is advantageously briquetted with the reducing agent before feeding to the furnace, and if mixtures of titanium dioxide and carbide are used, these are thoroughly mixed as powders prior to feeding to the furnace and again fed as briquettes. A suitable type of carbon useful for the reaction is calcined petroleum coke which has been crushed and ground to −325 mesh. The best results are obtained when all of the solid reactants including oxide, carbon, and carbide are ground to −325 mesh and milled together to be sure that the mixing is complete, then briquetted and fed in this form into the furnace. If the fine powder is used, the force of the reactions taking place and the high rate of evolution of the gases tends to throw reaction products out of the furnace. The need for mixing the carbon raw material with the starting agents is particularly evident in the case of the ilmenite.

In starting the reaction in the original shell, the arc is first struck between the suspended electrode and the bottom of the furnace through the interposition of a lump of TiC placed against the bottom. As soon as the arc is struck, the steam atmosphere is immediately initiated and the feeding of the briquetted titanium-carbon raw material is begun at the same time, in which case the feeding is directed to the region of the arc.

At the start of the operation, it is advisable to cover the floor of the furnace with raw mix. The volume of the center electrode is usually equivalent to about one-half to one-third the volume of the furnace itself and as indicated before, the entire shell is water cooled. Once a certain amount of titanium raw material has been fed into the arc, the violent fluctuations of the arc experienced on initiation of the reaction disappear and the continued decomposition takes place relatively quietly. It is evident that the influx of the water vapor is a large factor in this quiet operation of the furnace because if the water vapor stream is shut down at any time during the course of the reaction, the violent fluctuations in current and voltage in the arc stream immediately become evident.

The course of operation described above is continued until the furnace is substantially filled. In order to accomplish this, the center electrode is gradually and uniformly raised during the course of the reaction. At this point, the hot carbon electrode is removed from the furnace and the furnace is sealed in a controlled atmosphere for cooling. This sealing is accomplished as follows: When it is evident that the furnace is substantially full of completely reacted charge, hydrogen is bled into the furnace from a suitably situated inlet and at a rate such that a flame several feet in height shows around the electrode. When the feeding of hydrogen is properly regulated, the upper electrode is quickly pulled out and swung to one side. A water cooled top is clamped over the opening left as the result of removal of the upper electrode. This water cooled top has a small hole and continues to burn. The rate of flow of hydrogen is then reduced so that a flame roughly one foot in height is obtained, and the furnace is then allowed to cool substantially to room temperature under non-oxidizing conditions, i. e. hydrogen or vacuum, before it is opened. In a pig weighing 300 pounds, this cooling period requires 24 to 36 hours. If the furnace is opened while the titanium monoxide is still warm, it will reoxidize to higher oxides of titanium.

I may describe the novel reactions indicated in the foregoing on a general basis as follows: Titanium carbide or mixtures of titanium oxide and carbon or mixtures of titanium oxide and titanium carbide are heated above the melting point of titanium monoxide, namely roughly 1800° C., in the presence of water vapor or $CO_2$ or mixtures of $H_2O$ and $CO_2$ as an oxidizing agent under conditions where no oxygen or nitrogen is permitted to contact the hot mass, in which case the controlled atmosphere is inherently available from the gaseous products of the reaction indicated. A high purity titanium monoxide in high yield is obtained as a result. In a corollary of the above procedure, mixtures of ilmenite and carbon may be likewise oxidized with water vapor or $CO_2$ or mixtures of $H_2O$ and $CO_2$ to form mixtures of metallic iron and titanium monoxide. As oxides, mixtures of water vapor and carbon dioxide may be used and the presence of the water vapor at least as a part of the oxidizing agent appears to be a necessity. The general products of the reaction are titanium monoxide and the gas evolved is carbon monoxide and hydrogen.

A secondary procedure may sometimes be used to advantage particularly if $CO_2$ alone is used as the weak oxidant. In this case, the elimination of the carbide completely is somewhat difficult so that 2 to 4 per cent residual carbon in combined form may remain in the product. This may be reduced to a carbon-free condition by reducing the partially reacted mass in an atmosphere of $H_2O$. In fact, any product in which the carbon content has not been completely eliminated may be recovered in this fashion to yield high purity monoxide.

The following examples are illustrative of my method of practice:

*Example 1.*—A pot type single phase arc furnace is employed. Chiefly, this consists of a sheet iron shell constructed so that the entire exterior can be heavily water cooled. The top is closed over leaving an annular opening for an electrode with a clearance of at least ½ inch all the way around. A water cooled collar is attached to this annular opening so that the furnace cover proper extends up the electrode above the furnace for about 20 inches. A suitable size furnace for accomplishing the operation is an inside diameter of 2 feet and the center circular electrode has a diameter of one foot. Smaller or larger size furnaces and electrodes may be used if desired. Inlets in the cover of the furnace are provided for hydrogen gas and for feeding raw material. These inlets are also water cooled. The center electrode is center bored throughout its length with a half inch hole and a connection is made to the outside entry to this hole with an iron pipe threaded into the cold portion of the electrode.

In this first example, titanium carbide is the raw material being oxidized. To start the reaction, the water cooling is begun and a single lump of titanium carbide weighing about a pound is placed on the bottom of the furnace directly under the electrode. A layer of powdered TiC 0.5 inch thick is also placed on the floor. The arc is then struck by bringing the electrode into contact and then separating slightly. Immediately on striking the arc, powdered titanium carbide is fed continuously from the feed hopper and water vapor is forced into the furnace through the center hole in the top electrode. Using a 750 kva., A. C. transformer as the powering unit, a convenient rate of feeding is approximately 50 pounds per hour of powdered titanium carbide, and six hours is required to substantially fill the furnace; a pig of the order of 300 to 350 pounds being obtained in this period. The water is added at a rate of about 33 pounds per hour, this being slightly in excess of theoretical. The water is supplied from a steam boiler operating at a pressure of around 100 pounds per square inch. All air is removed from the boiler by first boiling vigorously at atmospheric pressure and then slowly replacing the air over the surface of the water with carbon dioxide. A closed system boiler is used so that all the water which is fed into the furnace for a particular run is thoroughly de-aired. The amount of water going into the furnace is metered through a valving system attached to the inlet tubes, and the input of the tubes has been previously calibrated for a particular setting. In view of the fact that the steam outlet has to be somewhat restricted, the velocity of the water vapor going into the furnace is quite high which represents an advantage with respect to insuring its mixing with the raw materials while in the vicinity of the arc. As the run continues, the center electrode is automatically raised to maintain a voltage and amperage condition something as follows: Voltages of the order of 12 to 25 volts and amperages in the range of 15,000 to 30,000 amperes. These conditions are maintained by automatic regulation of the raising and lowering of the electrode. When it appears as a result of the raising of the electrode that the furnace is at least ¾ filled with reacted product, tank hydrogen is bled into the furnace through a lead input provided, and the electric current is shut off. The equipment is allowed to stand without further movement for about an hour to permit the temperature of the carbon electrode to drop substantially, after which it is quickly raised from the furnace. A cover is clamped on the collar in which the center electrode had been inserted originally and this cover is fitted with an exit port to permit the hydrogen to continue to burn. During the actual reaction, a flame 2 to 4 feet in length burns around the center electrode and prevents its oxidation. After the furnace is sealed off, the flame from the opening in the top cover is regulated with respect to hydrogen flow so that it does not exceed about one foot in length, after which the entire contents and the furnace are allowed to cool substantially to room temperature under a protective hydrogen atmosphere which flows continuously. On cooling to room temperature, the water cooling is stopped, the top cover is taken off, and the furnace shell is then stripped. After a six hour run under the conditions indicated, a pig weighing in the range of 325 to 350 pounds is obtained, this amount varying with the time. Generally speaking, about 53 pounds of titanium monoxide is formed per hour. The material is a golden color and is very hard and brittle.

*Example 2.*—The same equipment and general techniques as described in Example 1 are used in this case. The raw material consists of an intimate mixture of titanium dioxide and titanium carbide in equi-molecular ratio equivalent to 61 parts of titanium carbide and 81 parts of titanium dioxide. This material is pressed into the form of briquettes for ease of feeding. Again the arc is initiated as described in Example 1 and the titanium oxide-titanium carbide mixture is again fed automatically at the rate of about 50 pounds an hour. The rate of water feed is 17 pounds per hour at the same pressure as described in Example 1. The rate of production to titanium monoxide under these conditions is around 38 pounds per hour, and roughly 8 hours are required to fill the furnace.

*Example 3.*—The reactants in this case are titanium dioxide and carbon. The equipment and procedures are the same as described in Example 1. The raw mix consists of a briquetted mixture of the powders of titanium dioxide and petroleum coke in the ratio of 81 parts of titanium dioxide and 36 parts of petroleum coke. The feeding rate for this mixture is 59 pounds per hour, under which conditions the rate of water feeding is 18 pounds per hour. Roughly 8 to 10 hours are required to fill the furnace. The reaction will also proceed if ⅔ the amount of carbon indicated in this example is used. However, the difficulty in this case is that the arc action is violent and for this reason, some difficulty is experienced in obtaining a complete reaction.

*Example 4.*—In continuous operation of the steam boiler in which a closed system technique is not used, it is advisable to insure that the atmosphere above the boiling steam always is completely free of air and this may be done conveniently by using a $CO_2$ atmosphere over the water in the boiler. Under these conditions, the operation is substantially identical with that in Example 1. The total amount of feed water may be decreased slightly, the difference being made up by the small amount of $CO_2$. The ratio of water to $CO_2$ is maintained at not less than 3 moles of water to one mole of $CO_2$ or 54 parts of water to 44 parts of $CO_2$. An amount in excess of this causes the reaction to reverse slightly and some residual carbon remains in the end product. Thus in accordance with Example 1, the titanium carbide is fed at the rate of 50 pounds per hour and the water at the rate of 25 pounds per hour, and the $CO_2$ at the rate of 20 pounds per hour. The amount of $CO_2$ may be conveniently metered by placing the carbon dioxide tanks on a dynamic weigher.

*Example 5.*—Minus 325 mesh ilmenite is mixed with similarly finely divided calcined petroleum coke in the ratio of 152 parts to 40 parts. The powdered ilmenite coke mixture is briquetted for ease of feeding. The operation of the arc furnace is the same as indicated in Example 1 and the briquetted ilmenite carbon mixture is fed into the furnace at the rate of 60 pounds per hour. The water rate of feed is 6 pounds per hour. About 10 hours are required to fill the furnace and a pig weighing roughly 350 pounds is obtained. After cooling, the pig is crushed and ground so that the entire charge passes a 20 mesh screen and the crushed charge is then subjected to magnetic separation. A yield of roughly 170 pounds of metallic iron and 180 pounds of titanium monoxide is obtained. Titanium monoxide in this case contains approximately 1 per cent iron.

*Example 6.*—In use of the titanium dioxide carbon mixtures, the reaction can be made to take place with a minimum of 2 moles of carbon per 1 mole of $TiO_2$. However, the furnace action and the arc action are erratic and violent and it is found that as the amount of carbon is increased, the course of reaction becomes smoother. Excess carbon in the reaction can be eliminated by a corresponding increase in water content as follows: A briquetted mixture of powdered titanium dioxide and powdered petroleum coke is made up in which the ratio of titanium dioxide to the petroleum coke is 81 to 72. The material is fed to the furnace at the rate of 50 pounds per hour and the water at the rate of 30 pounds per hour. Under these conditions, approximately 21 pounds of titanium monoxide are produced per hour, in which case roughly 15 hours of continuous operation is required to fill the furnace.

*Example 7.*—The briquetted mixture used for the feed consists of a combination of titanium dioxide and titanium carbide in the ratio of 81 parts of titanium dioxide to 122 parts of titanium carbide. This mixture is fed to the furnace at the rate of 50 pounds per hour and the rate of water feed is 12½ pounds per hour. About 6 to 6½ hours are required to fill the furnace. In these examples involving higher percentages of carbon or carbide, the action of the furnace is smooth and quiet.

*Example 8.*—The same sort of increase in carbon content may be applied to the decomposition of ilmenite providing sufficient water is also added to accommodate the excess carbon.

Other modes of applying the principle of the invention may be employed, change being made as regards the details described, provided the features stated in any of the following claims, or the equivalent of such, be employed.

I therefore particularly point out and distinctly claim as my invention:

1. The method of producing titanium monoxide which comprises: heating a carbon- and titanium-containing charge of the group consisting of (1) a mixture of carbon and a material of the group consisting of titanium dioxide and ilmenite, (2) a mixture of titanium carbide and a material of the group consisting of titanium dioxide and ilmenite, and (3) titanium carbide to a temperature of at least about 1800° C. in a reactive atmosphere consisting essentially of at least one mild oxidizing agent of the group consisting of water vapor and carbon dioxide; proportioning said charge and said atmosphere to provide one atom of oxygen for each atom of titanium and for each atom of carbon in the charge, removing the resulting effluent gas containing carbon monoxide and recovering the resulting titanium monoxide.

2. The method of producing titanium monoxide which comprises: heating a carbon- and titanium-containing charge of the group consisting of (1) a mixture of carbon and a material of the group consisting of titanium dioxide and ilmenite, (2) a mixture of titanium carbide and a material of the group consisting of titanium dioxide and ilmenite, and (3) titanium carbide to a temperature of at least about 1800° C. in a reactive atmosphere consisting essentially of at least one mild oxidizing agent of the group consisting of water vapor and carbon dioxide; proportioning said charge and said atmosphere to provide one atom of oxygen for each atom of titanium and for each atom of carbon in the charge, removing the resulting effluent gas containing carbon monoxide, cooling the resulting product in a non-oxidizing atmosphere and recovering the resulting titanium monoxide.

3. The method of producing titanium monoxide which comprises: grinding to at least minus 325 mesh a carbon- and titanium-containing charge of the group consisting of (1) a mixture of carbon and a material of the group consisting of titanium dioxide and ilmenite, (2) a mixture of titanium carbide and a material of the group consisting of titanium dioxide and ilmenite, and (3) titanium carbide; heating the charge to a temperature of at least about 1800° C. in a reactive atmosphere consisting essentially of at least one mild oxidizing agent of the group consisting of water vapor and carbon dioxide; proportioning said charge and said atmosphere to provide one atom of oxygen for each atom of titanium and for each atom of carbon in the charge, removing the resulting effluent gas containing carbon monoxide and recovering the resulting titanium monoxide.

4. The method of producing titanium monoxide which comprises: heating titanium carbide to a temperature of at least about 1800° C. in a reactive atmosphere consisting essentially of at least one mild oxidizing agent of the group consisting of water vapor and carbon dioxide; proportioning said carbide and said atmosphere to provide one atom of oxygen for each atom of titanium and for each atom of carbon in the carbide, removing the resulting effluent gas containing carbon monoxide and recovering the resulting titanium monoxide.

References Cited in the file of this patent

UNITED STATES PATENTS

| | | |
|---|---|---|
| 2,149,939 | Kinzie et al. | Mar. 7, 1939 |
| 2,240,343 | Muskat | Apr. 29, 1941 |
| 2,388,202 | Woodward | Oct. 30, 1945 |
| 2,681,848 | Wainer | June 22, 1954 |

OTHER REFERENCES

"Titanium," by Jelks Barksdale, 1949 ed., pages 94, 95, Ronald Press Co., New York.

McPherson and Henderson: "A Course in General Chemistry," third ed., 1927, page 163. Ginn and Co., New York.

"Titanium," by W. M. Thornton, 1927 ed., page 48. The Chemical Catalog Co., Inc., New York.

J. W. Mellor: "A Comprehensive Treatise on Inorganic and Theoretical Chemistry," vol. 5, page 884; vol. 7, pages 27 and 43, and vol. 8, page 7. Longmans, Green and Co., New York.